United States Patent
Jean et al.

(10) Patent No.: US 10,605,682 B1
(45) Date of Patent: Mar. 31, 2020

(54) MEMS UNPOWERED PRESSURE SENSOR

(71) Applicant: The United States of America as Represented by the Secretary of the Navy, Indian Head, MD (US)

(72) Inventors: Dan Jean, Odenton, MD (US); Scott Rauscher, Washington, DC (US); Andrew Jen, Alexandria, VA (US); Muhammad Khan, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 186 days.

(21) Appl. No.: 15/732,782

(22) Filed: Dec. 29, 2017

(51) Int. Cl.
*G01L 9/00* (2006.01)

(52) U.S. Cl.
CPC .......... *G01L 9/0051* (2013.01); *G01L 9/0042* (2013.01)

(58) Field of Classification Search
CPC ....... G01L 9/0051; G01L 9/0042; G01L 9/12; G01L 5/04; G01L 7/00; G01L 11/00; G01L 1/10; G02B 26/08; G01C 11/00
See application file for complete search history.

(56) References Cited

U.S. PATENT DOCUMENTS

| | | | |
|---|---|---|---|
| 5,747,705 | A | 5/1998 | Herb et al. |
| 5,808,210 | A | 9/1998 | Herb et al. |
| 6,546,804 | B2 | 4/2003 | Stemme et al. |
| 7,086,288 | B2 | 8/2006 | Lee et al. |
| 7,509,869 | B2 | 3/2009 | Liu et al. |
| 8,418,547 | B2 | 4/2013 | Kysar et al. |
| 2004/0125472 | A1 | 7/2004 | Belt |

*Primary Examiner* — Harshad R Patel
*Assistant Examiner* — Nigel H Plumb
(74) *Attorney, Agent, or Firm* — Fredric J. Zimmerman

(57) ABSTRACT

A MEMS unpowered pressure sensor device including a substrate, a flexible membrane operatively connected to the substrate, and a cantilever beam operatively connected to the substrate and suspended over the flexible membrane. The flexible membrane is configured to deform towards the cantilever beam upon pressure applied such that the deformed flexible membrane makes contact with the cantilever beam. The device may include a plurality of bond pads arranged around the flexible membrane. Each of the plurality of bond pads may include its own cantilever beam forming an array of a plurality of cantilever beams. The plurality of cantilever beams includes beams of different lengths. The device may include at least one bond pad on the substrate and over the flexible membrane. The cantilever beam may extend from at least one bond pad. The flexible membrane may deform in a substantially dome shape.

18 Claims, 4 Drawing Sheets

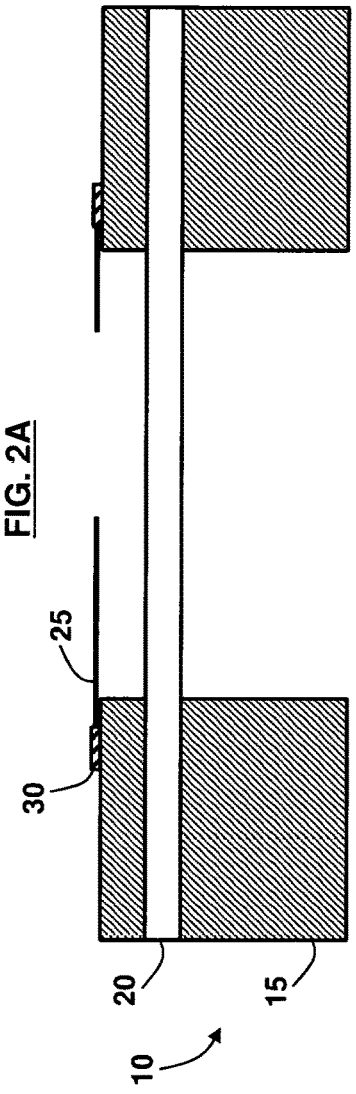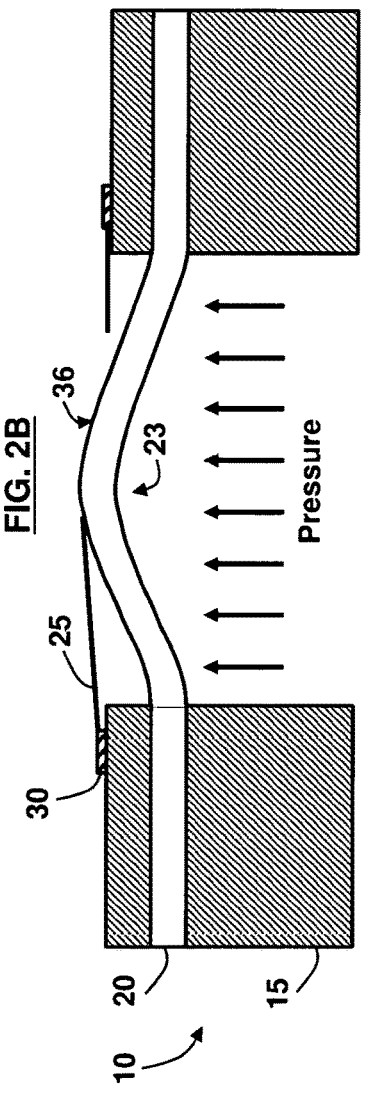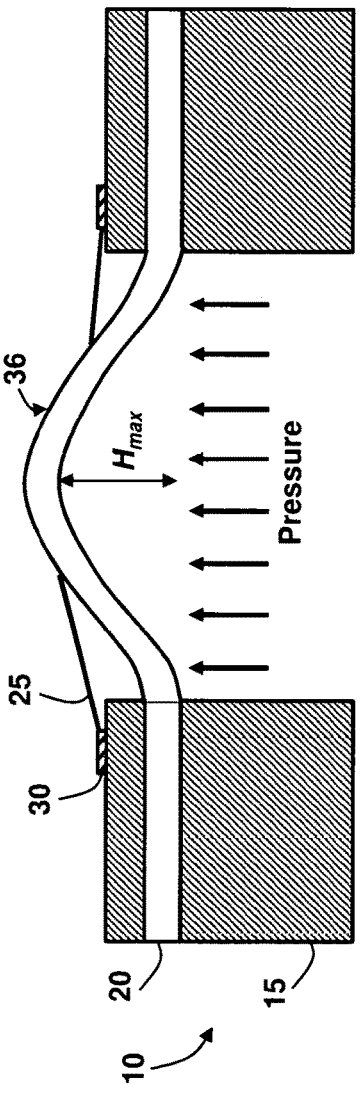

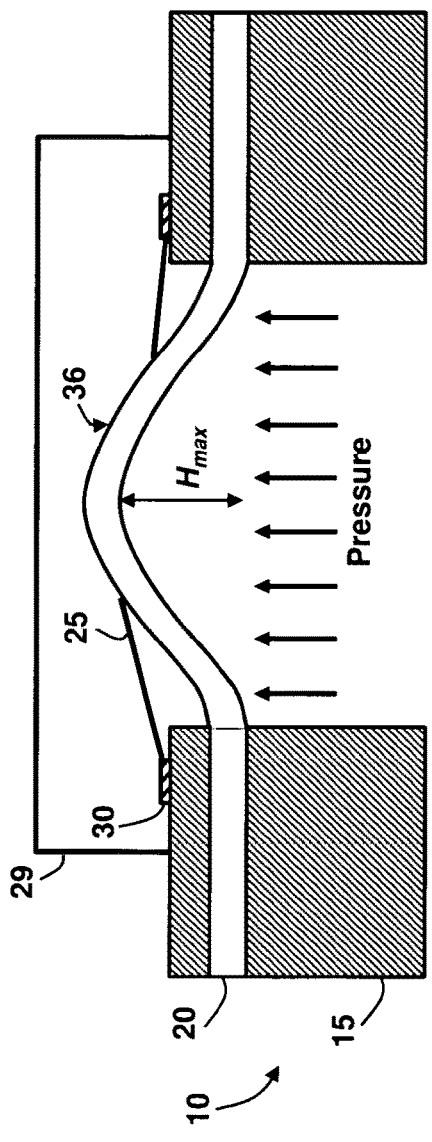
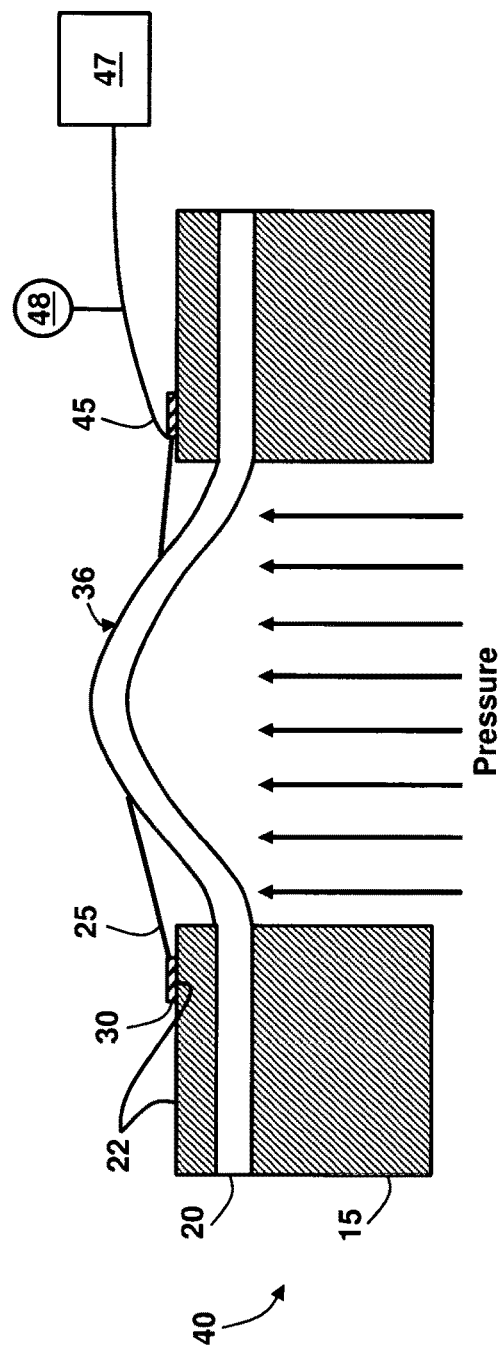

MEMS UNPOWERED PRESSURE SENSOR

GOVERNMENT INTEREST

The embodiments herein may be manufactured, used, and/or licensed by or for the United States Government without the payment of royalties thereon.

BACKGROUND

Technical Field

The embodiments herein generally relate to pressure sensors, and more particularly to pressure sensors used to sense blast pressures.

Description of the Related Art

There are various types of pressure sensors used to measure the pressure exerted by one object or fluid onto another object. When used as transducers, pressure sensors typically transmit an electrical signal based on the detected pressure. Pressure sensors may be incorporated into other systems and interact with other optical or electrical devices.

SUMMARY

In view of the foregoing, an embodiment herein provides a microelectromechanical system (MEMS) unpowered pressure sensor device including a substrate; a flexible membrane operatively connected to the substrate; and a cantilever beam operatively connected to the substrate and suspended over the flexible membrane, where the flexible membrane is configured to deform towards the cantilever beam upon pressure being applied thereon such that the deformed flexible membrane makes contact with the cantilever beam. The device may further include a plurality of bond pads arranged around the flexible membrane. Each of the plurality of bond pads may include its own cantilever beam forming an array of a plurality of cantilever beams, wherein the plurality of cantilever beams include beams of different lengths. The device may further include at least one bond pad on the substrate and over the flexible membrane. The cantilever beam may extend from the at least one bond pad. The flexible membrane may deform in a substantially dome shape. The flexible membrane may deform upwards towards the cantilever beam. The increased pressure causes an increase in the deformation of the flexible membrane causing greater actuation of the cantilever beam.

Another embodiment provides an apparatus including a substrate; a flexible membrane operatively connected to the substrate; a plurality of bond pads on the substrate and arranged around the flexible membrane; and a plurality of cantilever beams of different lengths, wherein each cantilever beam is operatively connected to its own bond pad, and wherein each cantilever beam extends over the flexible membrane, wherein the flexible membrane is configured to deform towards the cantilever beam upon pressure being applied thereon such that the deformed flexible membrane contacts the plurality of cantilever beams. The apparatus may further comprise a circuit configured to detect a start of the actuation of each of the plurality of cantilever beams. The flexible membrane may include a metal coating. The flexible membrane deforms upwards towards the plurality of cantilever beams. As the flexible membrane deforms, the flexible membrane actuates the cantilever beams that are longer in length before actuating the cantilever beams that are shorter in length. The increased pressure causes an increase in the deformation of the flexible membrane. As the flexible membrane continues to deform, the flexible membrane actuates the plurality of cantilever beams in order of length progressively from longest beam length to shortest beam length.

Another embodiment provides a method including arranging a plurality of cantilever beams of different lengths around and extending over a flexible membrane; applying pressure to the bottom of the flexible membrane causing the flexible membrane to deform; and actuating the plurality of cantilever beams upon engagement by the deformed flexible membrane. The flexible membrane deforms upwards towards the plurality of cantilever beams. The method may further include progressively increasing pressure upon the flexible membrane. Increased pressure causes an increase in the deformation of the flexible membrane. As the flexible membrane continues to deform, the flexible membrane actuates the plurality of cantilever beams in order of length progressively from longest beam length to shortest beam length.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2A is a cross-sectional side view of a MEMS unpowered pressure sensor device in a first configuration, according to an embodiment herein;

FIG. 2B is a cross-sectional side view of a MEMS unpowered pressure sensor device in a second configuration, according to an embodiment herein;

FIG. 2C is a cross-sectional side view of a MEMS unpowered pressure sensor device in a third configuration, according to an embodiment herein;

FIG. 2D is a cross-sectional side view of a MEMS unpowered pressure sensor device in a fourth configuration, according to an embodiment herein;

FIG. 3 is a cross-sectional view of an apparatus, according to an embodiment herein.

DETAILED DESCRIPTION

Figure 1:
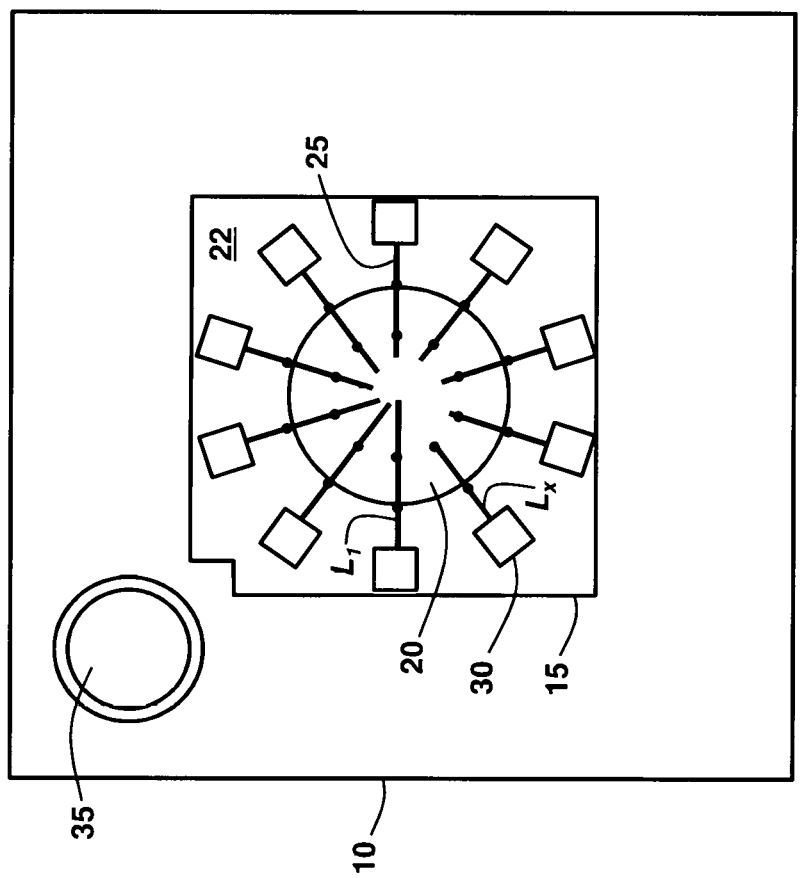
FIG. 1 is a top view of a MEMS unpowered pressure sensor device, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides a MEMS unpowered pressure sensor device. The pressure sensor includes a flexible MEMS membrane that deforms and contacts an array of overlying tiered cantilever beams of varying lengths causing actuation of the beams at different times. As the pressure increases, the membrane's deformation also increases thereby causing greater actuation of the beams. The beams are arranged in varying lengths such that full deformation of the membrane actuates all of the beams. Referring now to the drawings, and more particularly to FIGS. 1 through 4, where similar reference characters denote corresponding features consistently throughout the figures, there are shown exemplary embodiments.

FIG. 1 is a top view of a MEMS unpowered pressure sensor device 10, and FIG. 2A is a cross-sectional side view of the MEMS unpowered pressure sensor device 10 in a first configuration, according to an embodiment herein. The MEMS unpowered pressure sensor device 10 includes a substrate 15, a flexible membrane 20 operatively connected to the substrate 15, and a cantilever beam 25 operatively connected to the substrate 15 and suspended and extending over the flexible membrane 20. The flexible membrane 20 is configured to deform towards the cantilever beam 25 upon pressure being applied thereon such that the deformed flexible membrane 20 makes contact with and actuates the cantilever beam 25. The substrate 15 may include single crystal silicon, in one exemplary example. The flexible membrane 20 may include a non-composite membrane, in one exemplary example. Moreover, in an example, the flexible membrane 20 may include single crystal silicon or silicon nitride. In an exemplary example, the flexible membrane 20 may include a diameter ranging from about 1 mm to about 2.5 mm. In some examples, the cantilever beam 25 may include silicon, silicon nitride, or polymers, among other suitable materials. Moreover, the cantilever beam 25 may be configured in accordance with common cantilever beams used in typical MEMS applications. The first configuration shown in FIG. 2A depicts an un-deformed flexible membrane 20.

The device 10 may further include a plurality of bond pads 30 arranged around the flexible membrane 20. The bond pads 30 may include silicon, copper, aluminum, gold, or other suitable material. Each of the plurality of bond pads 30 may include its own cantilever beam 25 forming an array of a plurality of cantilever beams 25 around the flexible membrane 20, wherein the plurality of cantilever beams 25 comprise beams of different lengths $L_1, \ldots, L_x$. For example, the plurality of cantilever beams 25 may range in length between about 750 microns to about 1300 microns. In one example, the plurality of cantilever beams 25 are individually electrically isolated from one another. The number of cantilever beams 25 may determine the resolution of the pressure measurement, and is scalable in accordance with the embodiments herein. Accordingly, any number of cantilever beams 25 may be used in accordance with the embodiments herein. The device 10 may further include at least one bond pad 30 on the substrate 15 and over the flexible membrane 20. The cantilever beam 25 may extend from the at least one bond pad 30.

FIGS. 2B and 2C, with reference to FIGS. 1 and 2A, are cross-sectional side views of a MEMS unpowered pressure sensor device 10 in a first and second configuration, respectively, according to an embodiment herein. The flexible membrane 20 may deform upwards towards the cantilever beam 25 as pressure is applied on the underside 23 of the flexible membrane 20. The source of the pressure may be from an explosive blast in one example. Additionally, the device 10 may be used inside a pressure vessel (not shown) as a safety switch. The increased pressure causes an increase in the deformation of the flexible membrane 20 causing greater actuation of the cantilever beam 25. The device 10 may further comprise a membrane bond pad 35. Moreover, the flexible membrane 20 may deform in a substantially dome shape 36. Because of the dome shape 36 of the deformation of the flexible membrane 20, the cantilever beams 25 are sequentially contacted and actuated by the deformed flexible membrane 20 as the pressure increases and the dome shape 36 increases. Thus, the longest cantilever beam of length $L_1$ makes contact with the dome shape 36 of the flexible membrane 20 first, while shorter cantilever beam lengths $L_x$ make contact later as the flexible membrane 20 deforms further.

When a maximum inlet pressure is exerted upon the flexible membrane 20, as indicated in FIG. 2C, the flexible membrane 20 deforms to its maximum height $H_{max}$, and all overhanging cantilever beams 25 are in contact with the flexible membrane 20. In an example, the maximum inlet pressure may range between about 60 psi to about 100 psi. Also, the maximum height $H_{max}$ may be about 50 microns. Contact between the cantilever beams 25 and the flexible membrane 20 may be sensed via resistance change from the bond pad 35 attached to the flexible membrane 20, and the bond pads 30 attached to each cantilever beam 25. In another example shown in FIG. 2D, with reference to FIGS. 1 through 2C, a cap chip 29 may be placed above the cantilever beams 25 to restrict their movement, and to keep the flexible membrane 20 from deflecting too far in an overpressure situation.

FIG. 3, with reference to FIGS. 1 through 2D, is a cross-sectional view of an apparatus 40, according to an embodiment herein. The apparatus 40 includes a substrate 15, a flexible membrane 20 operatively connected to the substrate 15, a plurality of bond pads 30 on the substrate 15 and arranged around the flexible membrane 20, and a plurality of cantilever beams 25 of different lengths. Each cantilever beam 25 is operatively connected to its own bond pad 30, and each cantilever beam 25 extends over the flexible membrane 20. The flexible membrane 20 is configured to deform towards the cantilever beam 25 upon pressure being applied thereon such that the deformed flexible membrane 20 contacts the plurality of cantilever beams 25.

The flexible membrane 20 may include a metal coating 22. In an example, the metal coating 22 may include a stack of materials such as about 20 nm of chrome, about 40 nm of nickel or platinum, and about 100 nm of gold. Moreover, the lower edges of the cantilever beams 25 may also comprise a metal coating 22 such that the metal coating 22 may reduce the contact resistance of the cantilever beams 25. The flexible membrane 20 deforms upwards towards the plurality of cantilever beams 25. As the flexible membrane 20 deforms, the flexible membrane 20 actuates the cantilever beams 25 that are longer in length $L_1$ before actuating the cantilever beams 25 that are shorter in length $L_x$. The increased pressure causes an increase in the deformation of the flexible membrane 20. As the flexible membrane 20 continues to deform, the flexible membrane 20 actuates the plurality of cantilever beams 25 in order of length progressively from longest beam length $L_1$ to shortest beam length $L_x$. The apparatus 40 may further include a probe or circuit 45 to detect the start of the actuation of the cantilever beams 25, and a processing device 47 may be used to record when the flexible membrane 20 first contacts any of the cantilever beams 25. A resistive bridge 48 may be used to reduce the number of outputs from the MEMS unpowered pressure sensor device 10 from one output per cantilever beam 25 to one single output with a larger variable resistance range. The device 10 may be used to sense pressure readings in blast-induced events; for example, blasts that could cause traumatic brain injury.

Figure 4:
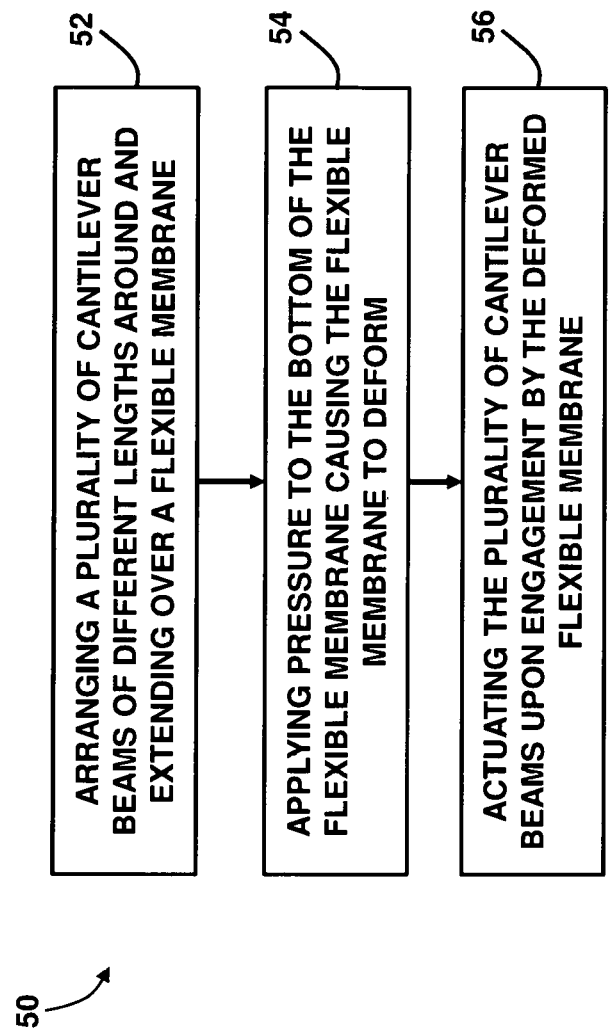
FIG. 4 is a flow diagram illustrating a method, according to an embodiment herein.

FIG. 4, with reference to FIGS. 1 through 3, is a flow diagram illustrating a method 50, according to an embodiment herein. The method 50 includes arranging (52) a plurality of cantilever beams 25 of different lengths around and extending over a flexible membrane 20; applying (54) pressure to the bottom of the flexible membrane 20 causing the flexible membrane 20 to deform; and actuating (56) the plurality of cantilever beams 25 upon engagement by the deformed flexible membrane 20. The flexible membrane 20 deforms upwards towards the plurality of cantilever beams 25. The method 50 may further include progressively increasing pressure upon the flexible membrane 20. Increased pressure causes an increase in the deformation of the flexible membrane 20. As the flexible membrane 20 continues to deform, the flexible membrane 20 actuates the plurality of cantilever beams 25 in order of length progressively from longest beam length $L_1$ to shortest beam length $L_x$. The plurality of cantilever beams 25 are able to sense multiple pressure threshold crossings due to their variable lengths.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of exemplary embodiments, those skilled in the art will recognize that the embodiments herein may be practiced with modification within the spirit and scope of the appended claims.

What is claimed is:

1. A microelectromechanical system (MEMS) unpowered pressure sensor device, comprising:
a substrate;
a flexible membrane being operatively connected to the substrate;
a plurality of bond pads being situated on the substrate and over the flexible membrane; and
a cantilever beam being operatively connected to the substrate and being suspended over the flexible membrane,
wherein the flexible membrane is configured to deform towards the cantilever beam upon mechanical pressure applied thereon such that the deformed flexible membrane makes contact with the cantilever beam,
wherein the flexible membrane is comprised of single crystal silicon and a metal coating,
wherein the plurality of bond pads are comprised of silicon and at least one of copper, aluminum, and gold, and
wherein the cantilever beam includes lower edges, and wherein the cantilever beam is comprised of silicon and the lower edges are comprised of a metal coating.

2. The device of claim 1, wherein the plurality of bond pads are arranged around the flexible membrane.

3. The device of claim 1, wherein the plurality of bond pads are arranged around the flexible membrane, wherein each of the plurality of bond pads comprises its own cantilever beam to form an array of a plurality of cantilever beams, and wherein the plurality of cantilever beams comprise beams of different lengths.

4. The device of claim 3, wherein each of the plurality of cantilever beam extends from one bond pad of the plurality of bond pads.

5. The device of claim 1, wherein the flexible membrane deforms to form a dome shaped flexible membrane.

6. The device of claim 1, wherein the flexible membrane deforms upwards towards the cantilever beam.

7. The device of claim 1, wherein increased pressure causes an increase in the deformation of the flexible membrane to cause greater actuation of the cantilever beam.

8. An apparatus, comprising:
a substrate;
a flexible membrane being operatively connected to the substrate;
a plurality of bond pads being situated on the substrate and being arranged around the flexible membrane; and
a plurality of cantilever beams of different lengths, wherein each cantilever beam is operatively connected to its own bond pad, and wherein each cantilever beam extends over the flexible membrane,
wherein the flexible membrane is configured to deform towards the cantilever beam upon mechanical pressure applied thereon such that the deformed flexible membrane contacts the plurality of cantilever beams,
wherein the flexible membrane is comprised of single crystal silicon and a metal coating,
wherein the plurality of bond pads are comprised of silicon and at least one of copper, aluminum, and gold, and
wherein the cantilever beam includes lower edges, and wherein the cantilever beam is comprised of silicon and the lower edges are comprised of a metal coating.

9. The apparatus of claim 8, further comprising a circuit being configured for detecting a start of the actuation of each of the plurality of cantilever beams.

10. The apparatus of claim 8, wherein the flexible membrane deforms upwards towards the plurality of cantilever beams.

11. The apparatus of claim 8, wherein as the flexible membrane deforms, the flexible membrane is configured to actuates the cantilever beams that are longer in length before actuating the cantilever beams that are shorter in length.

12. The apparatus of claim 8, wherein increased pressure causes an increase in the deformation of the flexible membrane.

13. The apparatus of claim 12, wherein as the flexible membrane continues to deform, the flexible membrane is configured to actuates the plurality of cantilever beams in order of length progressively from longest beam length to shortest beam length.

14. A method, comprising:
arranging a plurality of cantilever beams of different lengths around and extending over a flexible membrane, wherein the flexible membrane is operatively connected to a substrate, and wherein a plurality of bond pads are situated on the substrate and over the flexible membrane;

applying pressure to the bottom of the flexible membrane causing the flexible membrane to deform; and actuating the plurality of cantilever beams upon engagement of mechanical pressure by the deformed flexible membrane, wherein the flexible membrane is comprised of single crystal silicon and a metal coating, wherein the plurality of bond pads are comprised of silicon and at least one of copper, aluminum, and gold, and wherein the cantilever beam includes lower edges, and wherein the cantilever beam is comprised of silicon and the lower edges are comprised of a metal coating.

15. The method of claim 14, wherein the flexible membrane deforms upwards towards the plurality of cantilever beams.

16. The method of claim 14, further comprising increasing pressure progressively upon the flexible membrane.

17. The method of claim 16, wherein increased pressure causes an increase in the deformation of the flexible membrane.

18. The method of claim 14, further comprising increasing pressure, progressively, upon the flexible membrane, wherein as the flexible membrane continues to deform, the flexible membrane actuates the plurality of cantilever beams in order of length progressively from longest beam length to shortest beam length.

* * * * *